United States Patent [19]

Stein

[11] Patent Number: 4,953,888
[45] Date of Patent: Sep. 4, 1990

[54] LUGGAGE CART

[75] Inventor: Edward B. Stein, Chicago, Ill.

[73] Assignee: Stebco Products Corporation, Chicago, Ill.

[21] Appl. No.: 390,406

[22] Filed: Aug. 7, 1989

Related U.S. Application Data

[63] Continuation of Ser. No. 124,506, Nov. 23, 1987, abandoned.

[51] Int. Cl.$^5$ ................................................ B62B 1/12
[52] U.S. Cl. .................................... 280/654; 280/655; 280/47.29
[58] Field of Search ............... 280/47.18, 47.24, 47.27, 280/47.29, 47.371, 651, 652, 654, 655, 655.1, 659

[56] References Cited

U.S. PATENT DOCUMENTS

| | | | |
|---|---|---|---|
| 3,540,752 | 11/1970 | Anuskiewicz | 280/47.371 |
| 3,998,476 | 12/1976 | Kazmark, Sr. | 280/47.24 |
| 4,037,858 | 7/1977 | Adams | 280/47.29 |
| 4,072,319 | 2/1978 | Berger | 280/47.24 |
| 4,175,769 | 11/1979 | Kazmark | 280/654 |
| 4,221,402 | 9/1980 | Kazmark | 280/47.18 |
| 4,284,287 | 8/1981 | Esposito | 280/655.1 |
| 4,286,796 | 9/1981 | Esposito | 280/47.27 |
| 4,315,635 | 2/1982 | Esposito | 280/47.29 |
| 4,431,211 | 2/1984 | Carrigan | 280/47.29 |

FOREIGN PATENT DOCUMENTS 2053102 2/1981 United Kingdom ................ 280/654

Primary Examiner—Charles A. Marmor
Assistant Examiner—Tamara L. Finlay
Attorney, Agent, or Firm—Charles F. Meroni, Jr.

[57] ABSTRACT

A luggage cart including a pair of spaced wheels mounted on an axle. An upright frame and bracket means mounting the upright frame on the axle. The improvement comprising a luggage platform swingably supported on the axle in operative assembly therewith. A synthetic plastic latch bar pivotally mounted at one end on the luggage platform enabling the latch bar to be moved from a horizontal position to an upright position and vice-versa. A pivot structure between one end of the latch bar and the luggage platform enabling the latch bar to be swung from its horizontal platform latching position to its upright inoperative storage position. A latch structure adjacent a free end of the latch bar remotely located from the pivot structure for latched engagement with the frame when the latch bar is in its horizontal position for securing the swingable luggage platform in its horizontal luggage receiving position. A flexible hinge intermediately located between opposite ends of the latch bar enabling the outer free end of the latch bar to be lifted on the flexible hinge out of latched engagement by disengaging the latch structure from latched engagement with the platform.

32 Claims, 5 Drawing Sheets

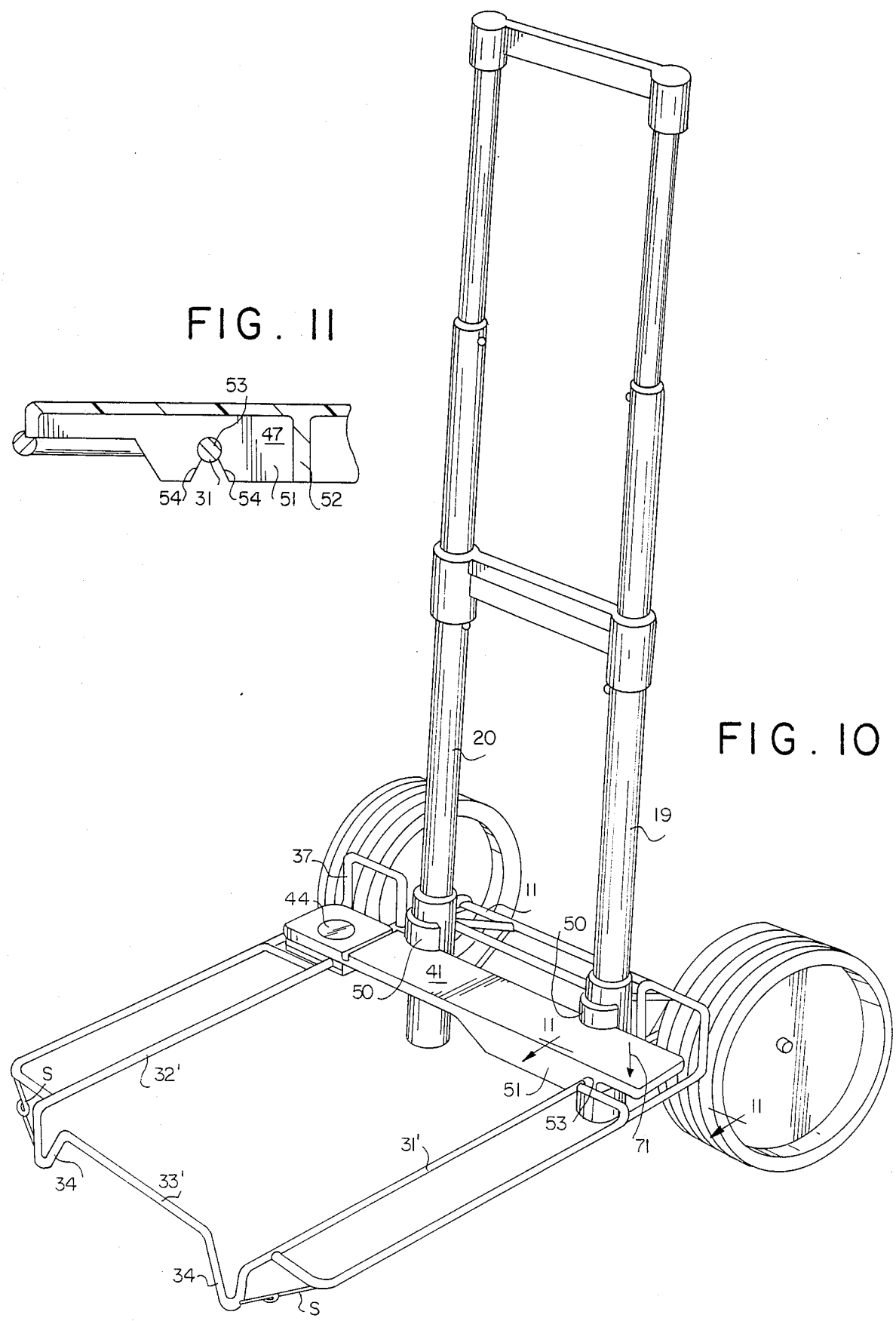

LUGGAGE CART

This is a continuation of Ser. No. 124,506, filed Nov. 23, 1987, now abandoned.

FIELD OF THE INVENTION

The present invention is concerned with a new and improved collapsible luggage cart which has a swingable platform movable from an upright position to a load receiving position, and a handle which is movable from its collapsed position to its upright extended position. The collapsible luggage cart is of the type that may be used for transporting personal luggage or heavy articles to and from an airplane or to and from a boat dock and alike. The present collapsible luggage cart is particularly adapted for being folded into a compact form so that it can be stored in an overhead bin above the passenger seats in an airplane.

The present invention more particularly concerns a new and improved collapsible luggage cart construction having a synthetic plastic or polypropylene latch bar which is pivotly mounted on the luggage carrier and swingable from a storage position to a luggage carrying position. More specifically, the swinging luggage bar has latch means which co-acts with the luggage carrier to secure the luggage carrier in its luggage carrying position when the luggage carrier is dropped from it storage position to a position generally at right angles to the stand. At this point in time, the bar is latched in place to rigidly position the luggage carrier so that it cannot move relative to the stand. Then when it is desired to collapse the luggage carrier and to place its components in their storage position, the latching bar is swingable on its pivot into an upright position generally parallel to the stand with the free end of the latch bar then being latchable to the luggage carrier to immobilize the latch bar and to place it in a storage position. Thereafter an elastic cord is used to secure the luggage carrier and the stand both in upright positions after the luggage carrier has been pivoted at its lower end on the axle from its luggage carrying position to its storage position.

DESCRIPTION OF THE PRIOR ART

Heretofore, various luggage carts have been proposed for use and many of such carts are in common use in many parts of the world today. Examples of such previously known luggage carts are disclosed in the following U.S. Pat. Nos.:

| Patent No. | Patentee |
| --- | --- |
| D-246,774 | Patsy Esposito |
| 3,540,752 | Anuskiewicz |
| 3,998,476 | Kazmark, Sr. |
| 4,037,858 | Adams |
| 4,072,319 | Berger |
| 4,284,287 | Patsy Esposito |
| 4,286,796 | Patsy Esposito |
| 4,315,635 | Patsy Esposito |
| 4,431,211 | Richard M. Carrigan |

The state of the art concerning collapsible luggage carts has been discussed in length in U.S. Pat. No. 4,286,796. As for the patents that have been listed above, none of then are believed to be in any way anticipatory of the improved cart or carrier herein disclosed.

The patents have been listed above for the purpose of showing the state of the art.

SUMMARY OF THE INVENTION

According to the present invention, a collapsible luggage cart has been provided which includes an axle, wheels mounted thereon, an upright stand mounted on the axle and a luggage carrier pivotably mounted on the cart, the improvement comprising a swingable latch bar swingably mounted at one end on the luggage carrier, latch means secured to the luggage carrier cooperable with the swingable latch bar in either of two separate preselectable positions for locking the luggage carrier in a collapsed upright position for easy transport of the cart and also alternatively for locking the luggage carrier in a luggage carrying position for ready transport of luggage.

According to other features of my invention, I have provided a new and improved swingable latch bar that is comprised of unfilled polypropylene of an injection mold grade.

According to still other features of my invention, I have provided the cart with two horizontally space vertically extending posts in ground engagement and cooperable with the wheels to maintain the cart in a self standing position.

Yet other features of my invention concern a cart having a luggage carrier which includes a U-shaped wire frame and having a cross piece portion at a bight area of the U-shaped wire frame, the cross piece portion having a pair of spaced U-shaped legs for supporting the luggage carrier in ground engagement at its end most distant from its pivot connection with the cart, the legs having notches engageable with the upright posts enabling the luggage carrier to hug the posts on the upright stand in a snug compact nested assembly.

According to further features of my invention I have provided a collapsible luggage cart including an axle, wheels mounted thereon, an upright stand mounted on the axle and a luggage carrier pivotably mounted on the cart and being pivotally movable from an upright storage position to a generally horizontal luggage carrying position, the improvement comprising a swingable latch bar swivelly mounted only at one end on the luggage carrier and selectably movable back and forth from a storage position to a luggage carrier locking position and vice versa so as not to interfere with pivotal folding movement of the luggage carrier, latch means carried on an opposite end of said bar and locking the latch bar in the storage position with said luggage carrier for easy transport of the cart and also alternatively locking the latch bar to said luggage carrier when it is in the generally horizontal luggage carrying position for ready transport to luggage, the latch bar extending along the length of the luggage carrier when in said storage position and extending transversely of the luggage carrier when the luggage carrier is in said luggage carrier locking position.

Still other features of my invention concern a latch bar having hinge means which comprise a synthetic web having a reduced thickness compared to the thickness of the latch bar, the reduced thickness being of the order of 0.013"–0.020" thick.

According to yet further features of my invention I have provided a luggage cart including a pair of spaced wheels mounted on an axle, an upright frame, bracket means mounting the upright frame on the axle, the improvement comprising a luggage platform swingably supported on the axle in operative assembly therewith, the platform being pivotally mounted on the cart and movable from a luggage carrying position to an upright storage position, a synthetic plastic latch bar pivotally mounted at one end on the luggage platform enabling the latch bar to be moved from a horizontal platform latching position to a storage position so as not to interfere with pivotal folding movement of the luggage platform and vice-versa, pivot means between one end of the latch bar and the luggage platform enabling the latch bar to be swung from its horizontal platform latching position to its storage position, latch means adjacent a free end of said latch bar remotely located from said pivot means for latched engagement with the frame when the latch bar is in its horizontal platform latching position for securing the swingable luggage platform in its horizontal luggage receiving position, and a flexible hinge intermediately located between opposite ends of said latch bar enabling the outer free end of the latch bar to be lifted on the flexible hinge out of latched engagement by disengaging said latch means from latched engagement with said platform.

DESCRIPTION OF THE DRAWINGS

FIG. 10 is an enlarged perspective view showing the cart in its assembled position ready for the receipt of luggage thereon; and FIG. 11 is an enlarged fragmentary section as viewed on the lines 11—11 in FIG. 10 looking in the direction indicated by the arrows.

DESCRIPTION OF THE PREFERRED EMBODIMENTS

Figure 1:
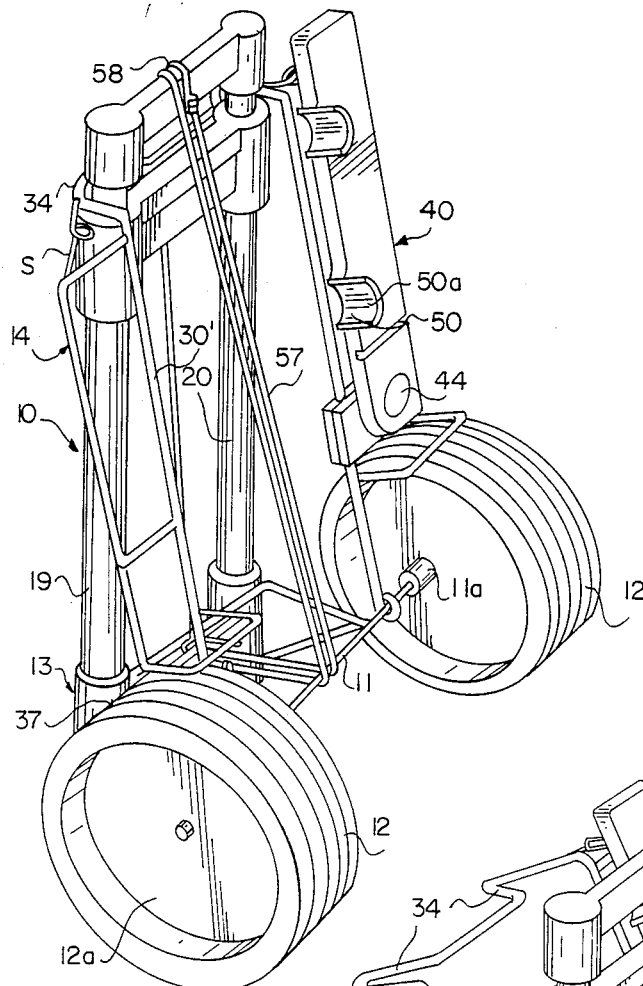
FIG. 1 is a perspective view of my luggage cart showing the car in its so-called storage position.
Figure 2:
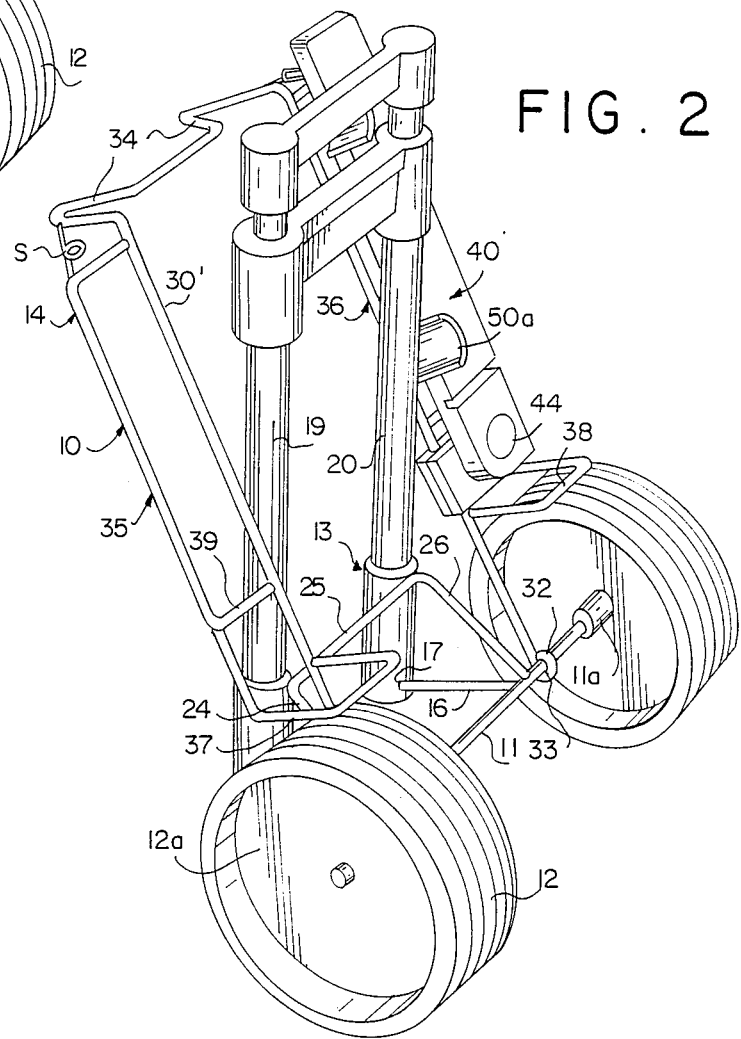
FIG. 2 is a perspective view of the same cart illustrated in FIG. 1 only with the components being partially disassembled.

The reference numeral 10 indicates generally my collapsible luggage cart. The cart is shown in various positions in the drawings as previously set forth. The cart 10 further includes a horizontal axle 11 which has wheels 12, 12 mounted on wheel bearings 11a which are in the form of synthetic plastic sleeves. These sleeves are positioned at the inside of the wheels 12, 12 and opposite ends of the axle are mounted in the bearings 11a and extend through the wheel hubs 12a as shown in FIGS. 1 and 2. Mounted upon the wheels and the axle is an upright stand indicated generally at 13. Also mounted on the axle 11 is a luggage carrier also indicated generally at 14.

Figure 5:
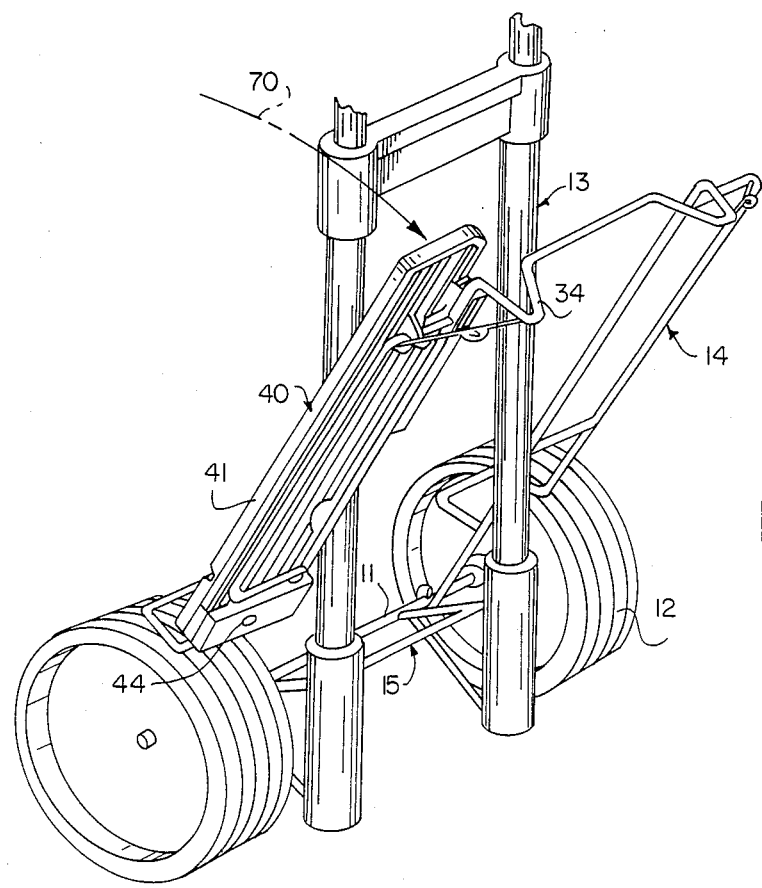
FIG. 5 is an enlarged perspective view similar to FIG. 2 only as viewed from an opposite corner and showing how the luggage carrier can be moved relative to the stand in the direction indicated by the arrow.

The stand 13 has a stand frame 15 (FIG. 5). This frame 15 includes a pair of lower stand frame legs or posts 16,16 which are secured at opposite ends of the frame legs by welds 17 and 18 to the axle 11 and to the upright stand legs 19 and 20 (FIG. 3).

The welds 17,17 on the frame legs 16,16 are located beneath horizontal strand brace leg 21. The leg 21 extends through aligned sockets 22 (FIG. 3) provided in the stand legs 19 and 20 in assembly therewith. The stand frame 15 further includes U-shaped stand frame member 23 which is mounted in angular inclined relationship to the lower stand frame legs 16,16. The U-shaped stand frame number 23 is comprised of three legs 24, 25 and 26. Opposite ends of frame leg 25 are welded at 27 and 28 to the upright stand legs 19 and 20 (FIG. 3). Now, the free ends of the stand frame legs 24 and 26 are welded at 29 and 30 to the axle 11 to provide a reinforced connection between the stand frame 15 and the axle 11. The welds 27, 28, 29 and 30 (FIG. 3) provide a four point welded connection of the U-shaped stand frame member 23 to the legs 19 and 20 and to the axle 11. (FIGS. 2 and 3).

With this rigidified construction, the stand 13 can be mounted in secured assembly with the axle and the wheels for carrying a substantial load on the luggage carrier 14 of the cart.

Figure 3:
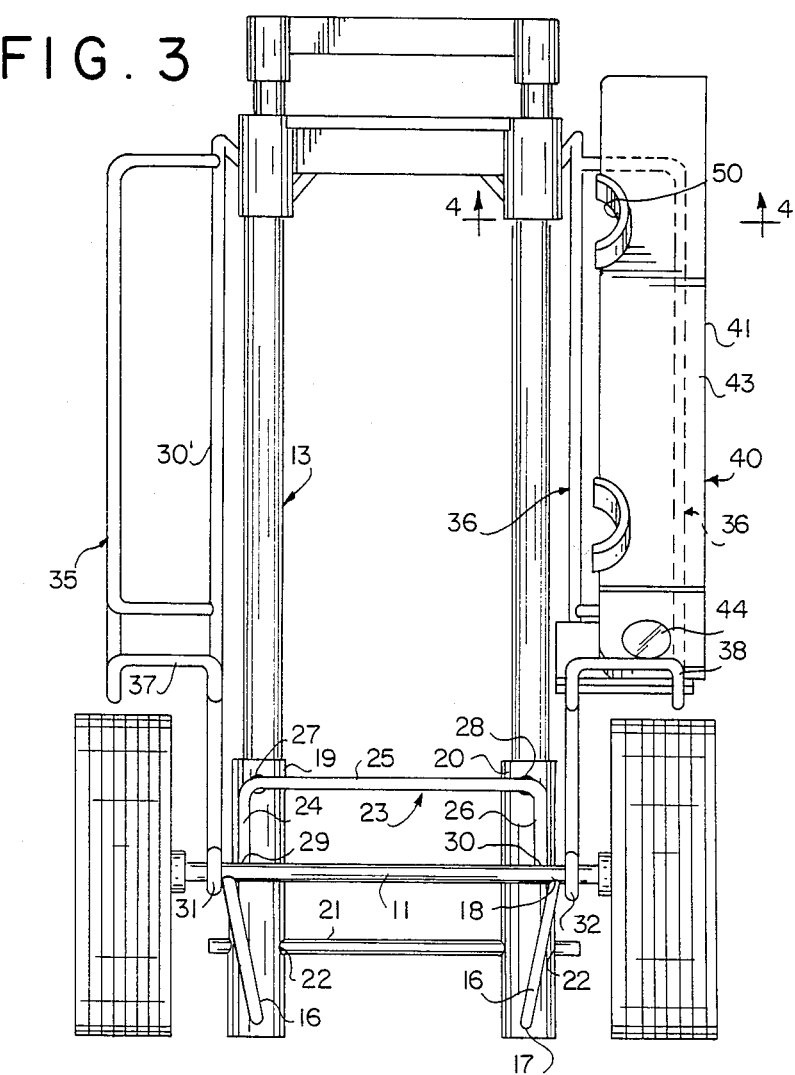
FIG. 3 is a rear elevation of the cart shown in FIG. 1 only with the cord removed.

The luggage carrier 14 itself is of a heavy wire frame construction and includes a U-shaped main carrier member 30' (FIG. 3) with opposite ends of the U being hook-shaped as indicated at 31 and 32 (FIG. 3). These hook-shaped members 31 and 32 are engaged over the axle 11 and secured in pivoted engagement therewith at 33 (FIG. 2). The hook-shaped members 31 and 32 are adapted to pivot on the axle 11 as the luggage carrier is rotated from its upright position to its horizontal luggage receiving position. The U-shaped main carrier member or wire frame 30' includes a cross piece portion 33' at a bight of the U-shaped wire frame. The cross piece portion 33' has a pair of spaced U-shaped legs 34,34 for supporting the luggage carrier in ground engagement at its end most distant point from its pivotal connection with the cart. These U-shaped legs 34,34 also define leg notches which are engagable with the upright posts to hug the posts 19, 20 (FIG. 1) on the upright stand in snug compact nested assembly when the luggage cart 10 is in its so-called storage position (FIG. 1).

Figure 6:
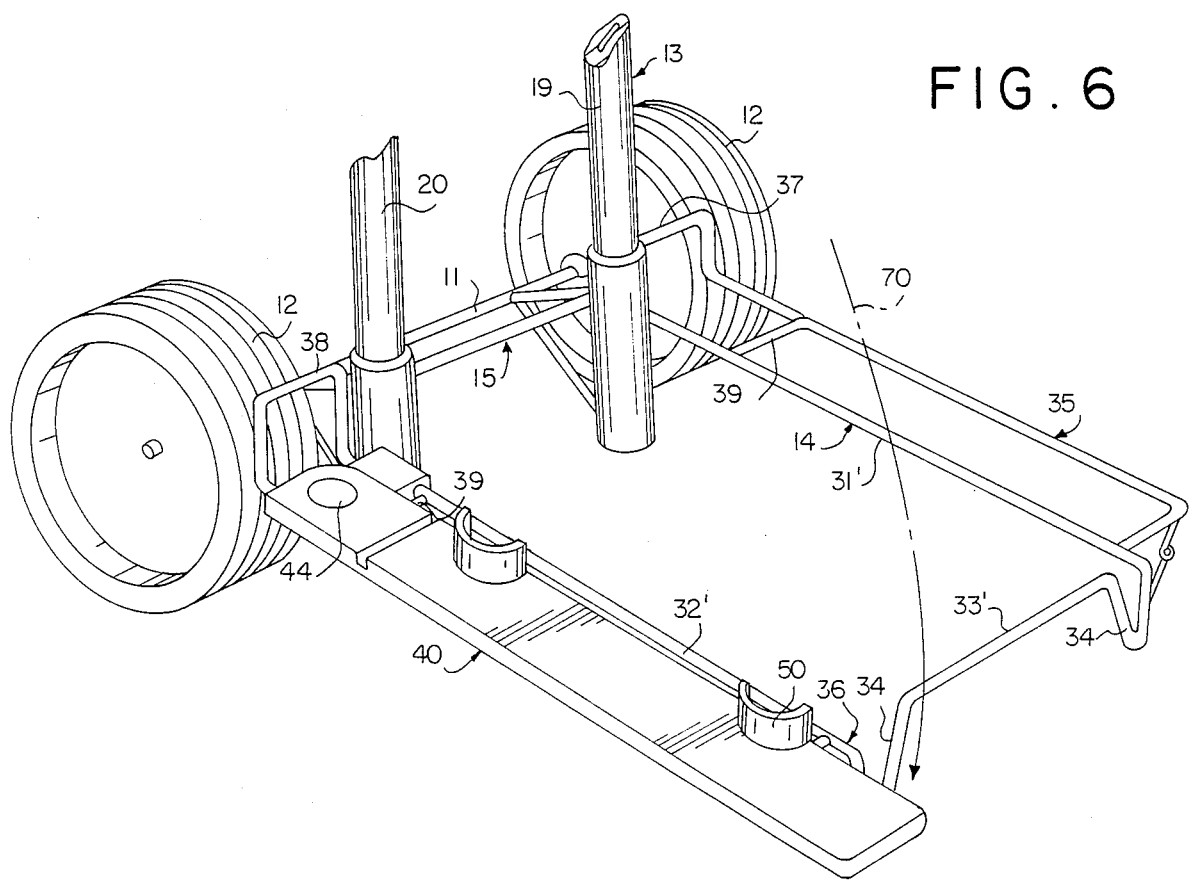
FIG. 6 is a further development of the view shown in FIG. 5 with the arrow showing how the luggage carrier can be moved into ground engagement.

The U-shaped wire luggage carrier member 30' includes parallel luggage carrier legs 31' and 32' and a cross piece leg or portion 33. The cross piece leg or portion 33' joins the parallel luggage carrier legs 31' and 32' together. Mounted on opposite sides of the luggage carrier 14 and joined with the carrier legs 31' and 32' are a pair of wire side reinforcing frames 35 and 36 which are disposed on opposite sides of the luggage carrier for supporting luggage with the expanded width afforded by the frames 35 and 36. As stated before, the entire luggage carrier 14 is carried upon the pair of spaced U-shaped wire legs 34,34 (FIG. 6). These legs are of a sufficient vertical dimension so that when the luggage carrier 14 is in its so-called "down" or luggage receiving position that the platform or luggage carrier will be disposed essentially in a horizontal plane. Positioned at opposite sides of the luggage carrier 14 are a pair of U-shaped wheel guards 37 and 38. These guards not only serve to prevent the luggage from contacting the wheels but also assist in stabilizing the luggage when it is on the cart 10 so that it will be less of a tendency for the luggage to become unsettled or moved off of the carrier 14 as the cart is moved or pulled across the area of use by the operator.

The side frames 35 and 36 are also provided with frame support legs 39—39 (FIG. 6) for reinforcing the side frames and also for assisting in the carrying of a latch bar structure 40 on the luggage carrier 14. The side frames 35 and 36 are joined by springs S to the feet 34,34 on the frame by 33' of the luggage carrier to support outer ends of the side frames.

Figure 7:
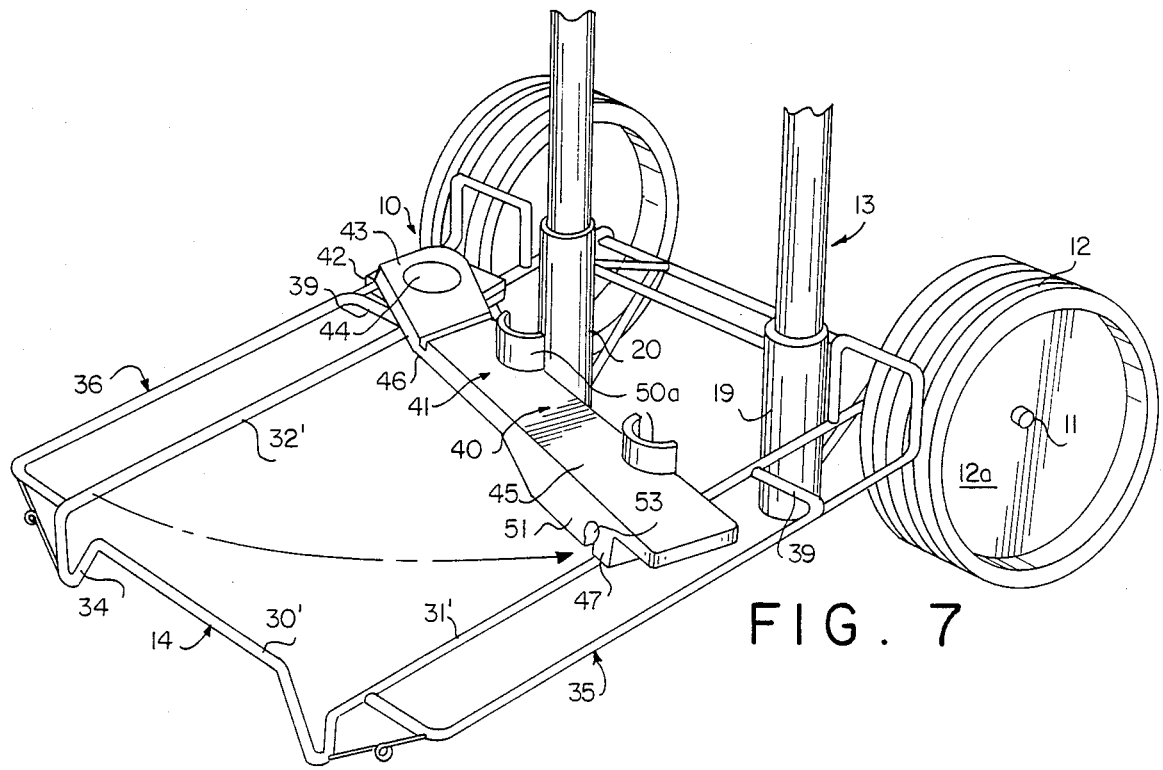
FIG. 7 is an enlarged fragmentary perspective view illustrating how the latch bar can be moved into engagement with the carrier and the stand to lock the components in a luggage carrying position.

From a study of the operation of the latch bar structure 40 it will be seen that a pivotly mounted latch bar 41 is provided for locking the luggage carrier 14 in its horizontal luggage carrying position (See FIG. 7).

The latch bar 41 includes a stationary latch bar section 42, a super imposed pivoting latch bar section 43. The super imposed pivoting latch bar section 43 pivots at pivot 44 on the section 42 (FIG. 7). It will be observed that pivot or pivot member 44 has a larger diameter at its top side than it does at its bottom side by comparing the appearance of the pin in FIG. 5 and 6. A lock pin (not shown) can be used to secure the pivot member 44 in assembly with the stationary latch bar section 42. This pin also operates to connect or join the stationary latch bar section 42 with the super imposed pivoting latch bar section 43 in pivoting assembly together. The latch bar 41 also includes a main latch bar section 45 which is joined be a hinge 46 to the pivoting latch bar section 43. The hinge 46 comprises a reduced thickness or area in the latch bar section 43. The hinge 46 operates on an axis which is 90° of the axis of the pivot 44 whereby the latch bar 41 pivots in two planes, either in a horizontal plane or in a vertical plane or at least to a more upright position as is illustrated in FIG. 7. The latch bar has a notched or latched latching portion 47 near an outer free end of the latch bar 41 so that it can be moved into and out of latched engagement with the luggage carrier leg 31' on the luggage carrier 14 (FIG. 7).

Now from a review of FIG. 10, it will be seen that when the latch bar 41 is in its secured position it has a pair of arcuate C-shaped notched areas 50,50 movable into and out of nested engagement with the stand legs or posts 19 and 20 enabling the luggage carrier to hug the posts on the upright stand in snug compact nested assembly. It will be further observed that the notched areas 50,50 have an upstanding arcuately shaped flange 50a to increase the area of engagement between the C-shaped notched area and the legs for stabilizing the manner of the engagement of the latch bar 41 with the upright posts 19 and 20. The upstanding flange 50a of the C-shaped notched areas 50,50 are formed integral of the same synthetic plastic as the latch bar 41.

Now the pivotly mounted latch bar 41 also has an enlarged plastic area (FIG. 10) providing an integral downwardly extending latch bar flange 51 (FIG. 11). Disposed adjacent to the latch bar flange is a reinforcing latch bar rib 52 (FIG. 11). Provided in an outer end of the latch bar 41 and more particularly in the latch bar 51 is a latch bar retainer notch or notched generally arcuately shaped edge 53. Adjacent to the notch or arcuate edge 53 are lead in flanges 54,54 which enable the operator to more readily center and engage the luggage carrier leg 31 therein. It will thus be observed that the notch or arcuate edge 53 serves to provide a horizontal locked position for the latch bar 57 for locking the luggage carrier in its luggage carrying position for ready transport of luggage.

Figure 4:
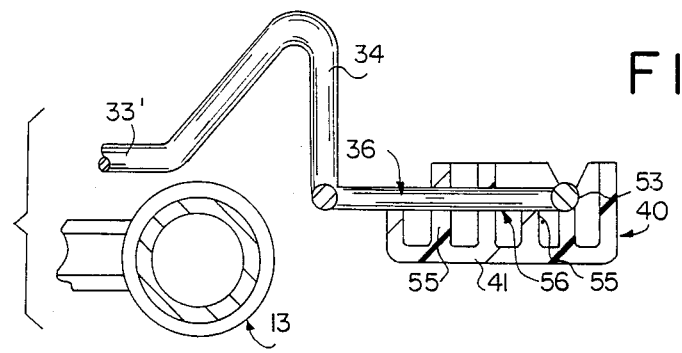
FIG. 4 is a horizontal section taken on the line 4—4 looking in the direction indicated by the arrows as seen in FIG. 3.

Now referring to FIGS. 3 and 4 it will be further observed that the latch bar 41 has a series of longitudinally extending reinforcing ribs 55 (FIG. 4). The latch bar further 41 is further formed so as to have a cut out area 56 for enabling frame portions of the luggage carrier 14 to be snugly engaged in the cut out area 56 in assembly with the latch bar 41 when the latch bar is in its upright locked or stored position as seen in FIG. 3. In order to lock the luggage bar 41 in its upright position, the latch bar is further provided with a notched area 56. Lead in converging edges or flanges 54,54 are disposed in adjacency to the notched area 56 to assist in allowing a leg of one of the reinforcing wire side frames to be retainingly engaged in the retainer notch 53 (FIG. 4). This locking action between the latch bar 41 and the side frame of the luggage carrier 14 permits the swingable latch bar 41 to be locked in its upright stored position for easy transport of the cart when the luggage carrier 14 is in its "stored" position. In order to further maintain the components of the cart 10 in a collapsed or stored position, the cart is provided with an elastic strap 57 having hooks 58 at opposite ends. Straps of this type of well-known in the art. More specifically, the strap 57 is shown in FIG. 1 and this Figure illustrates how the strap serves to maintain the luggage carrier 14 in an upright collapsed or stored position on the stand 15. In order to release the stand and the luggage carrier, the cord 57 must be removed by disengaging the hooks 58. After the elastic cord 57 is removed, then the force of gravity acting on the luggage carrier 14 moves the luggage carrier 14 to a relaxed position as shown in FIG. 2.

Figure 8:
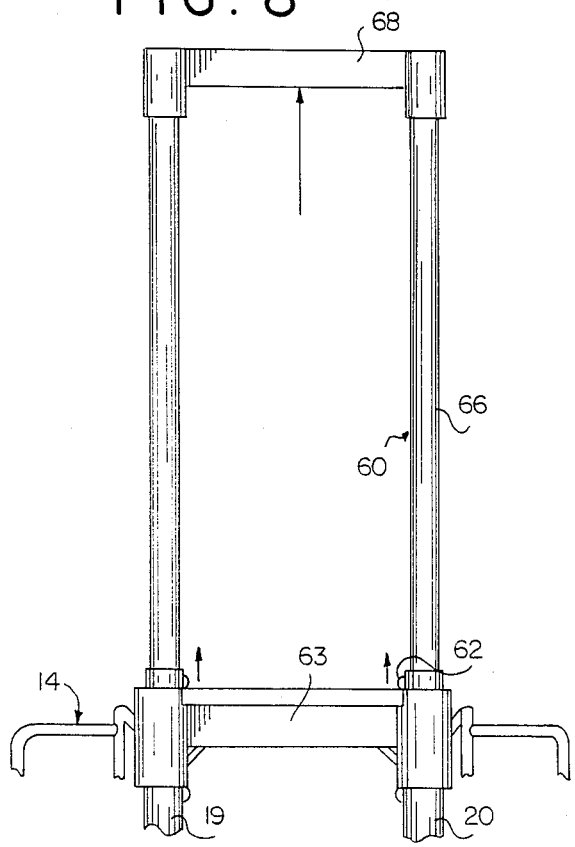
FIGS. 8 and 9 are fragmentary rear elevations showing the manner in which the handle can be expanded by exerting forces to the handle structure in the direction indicated by the arrows.
Figure 9:
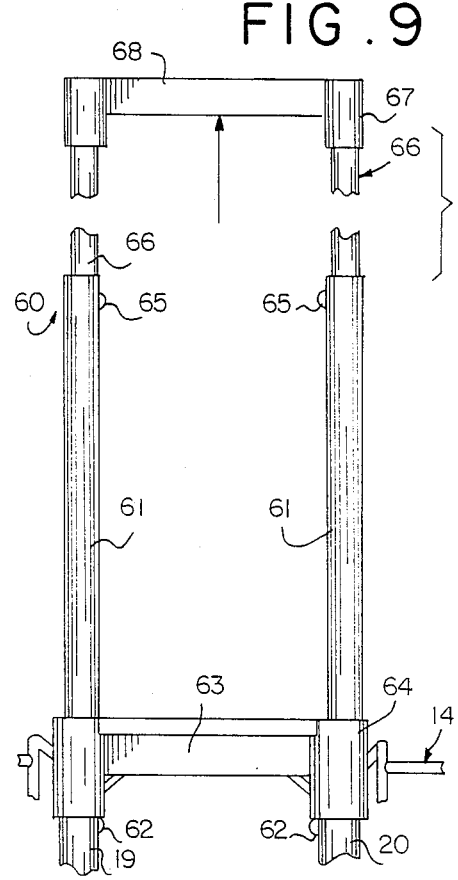

Now in order to facilitate the transport of the cart 10 by the user, either before or after luggage bags are placed on the luggage carrier 14, the cart 10 is provided with an expanding handle construction as indicated generally at 60 in FIG. 8 and 9. To this end, the expanding handle construction 60 includes a series of telescoping superimposed handle sections 61,66 and push button 62,62. The push buttons are spring actuated so that they normally are in an extended spring urged position but when depressed allow the superimposed sections 66—66 to slide over the push buttons 62,62 so that the handle 60 can either be expanded or contracted as required. The intermediate section 63 also includes a pair of upright posts 64,64. Disposed above the intermediate section 63 are the sections 61,11. The uppermost handle section 66 which includes a pair of handle legs 67,67 and a handle 68. From a consideration of FIGS. 8 and 9, it will thus be understood how the handle can be expanded and/or contracted either into an operating position or into a storage position as desired.

In the normal operation of my cart, the user can commence use of the cart by removing the elastic cord 57 as previously described. With the removal of the cord, the gravity action force on the luggage carrier causes the luggage carrier 14 to move to the position shown in FIG. 2. At this point, the user can then apply a force to the luggage carrier 14 as indicated by the arrow 70 in FIG. 5 to cause the luggage carrier 14 to move into ground engagement so that its feet 34,34 are in ground engagement as seen in FIG. 6. The arrow 70 in FIG. 6 also shows the further pivoting movement of the luggage carrier 14 from its FIG. 5 to its FIG. 6 position as the carrier 34 pivots at the point where the hook-shaped members 31 and 32 are engaged with the axle 11. Now that the luggage carrier 14 has been moved to its luggage carrying position, the latching bar 41 can then move on its pivot 44 into its horizontal latched position. When in its horizontal latched position, the notched area 53 (FIG. 11) can be forceably urged into engagement with the carrier leg as shown in FIGS. 10 and 11.

After the user has used the cart and has removed the cord 57 from the luggage secured to the cart, the cart can be collapsed. The collapsing of the cart can be brought about by lifting the outer end of the luggage bar 41 by applying a force in an opposite direction to the arrow indicated at 71 in FIG. 10. The arrow 71 serves to show how the outer end of the latch bar 41 can be pushed to engage the notched area 53 with the leg of the luggage carrier 14. After the luggage bar 41 has been disengaged, it can be rotated 90° on pivot 44 into parallelism with the legs of the luggage carrier. At this point in time, a force can again be applied to the outer end of the latch bar structure 40 as generally indicated at 70 in FIG. 6 to cause the luggage cart and the outer end of the latch bar 41 to be secured to maintain the latch bar in a secured upright position as shown in FIG. 3.

It is thus seen, therefore, that there is provided an improved article in which the objects of the invention are achieved and which are well adapted to meet all conditions of practical use.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In a collapsible luggage cart including an axle, wheels mounted thereon, an upright stand mounted on the axle and a luggage carrier pivotably mounted on the cart and being pivotally movable from a upright storage position to a generally horizontal luggage carrying position, the improvement comprising a swingable latch bar swively mounted only at one end on the luggage carrier and selectably movable in a plane substantially parallel to the luggage carrier from a storage position to a luggage carrier locking position, latch means carried on an opposite end of said bar and locking the latch bar in said storage position with said luggage carrier so as not to interfere with pivoted folding movement of the luggage carrier and also alternatively locking the latch bar to said luggage carrier when the carrier is in the generally horizontal luggage carrying position for ready transport of luggage, the latch bar extending along the length of the luggage carrier when in said upright storage position and extending transversely of the luggage carrier and adjacent and abutting said upright stand when the luggage carrier is in said luggage carrying position.

2. The cart of claim 1 further characterized by the swingable latch bar and the latch means comprising molded synthetic plastic components having a snap-in, snap-out retaining action for latching the swingable latch bar to the luggage carrier in either of said two positions.

3. The cart of claim 1 further characterized by said upright stand including two horizontally spaced vertically extending posts in ground engagement and cooperating with said wheels providing four points of ground engagement to maintain the cart in a self standing position.

4. The cart of claim 3 further characterized by said luggage carrier comprising a U-shaped wire frame and having a cross piece portion at a bight area of the U-shaped wire frame, the cross piece portion having a pair of spaced U-shaped legs for supporting the luggage carrier in ground engagement at an end most distant from its pivot connection with the cart, the legs having notches engageable with said upright posts enabling the luggage carrier to hug the posts on the upright stand in a snug compact nested assembly.

5. The cart of claim 1 further characterized by said luggage carrier comprising a U-shaped wire frame having two legs and a cross piece portion, said swingable latch bar being pivotally connected to one leg of said U-shaped wire frame and with said latch means being affixed to the other leg of said U-shaped wire frame while said platform is in its horizontal luggage carrying position.

6. The cart of claim 1 further characterized by said swingable latch bar being swingable through an angle of at least 90 degrees from its storage position to its luggage carrier locking position.

7. The cart of claim 1 further characterized by said swingable latch bar being swingable through an angle of at least 90 degrees from its storage position to its luggage carrier locking position, the latch bar being latchable when said platform is in either of said two separate positions.

8. The cart of claim 1 further characterized by said latch bar having hinge means intermediate its ends, said latch means being positioned on a free opposite end of said latch bar and with said free end being manually liftable and movable on said hinge means in a direction towards and away from said upright stand when said luggage carrier is in its luggage carrying position for unlocking and locking the latch bar and thereby freeing and locking the luggage carrier in its luggage carrying position.

9. In a collapsible luggage cart including an axle, wheels mounted thereon, an upright stand mounted on the axle and a luggage carrier pivotably mounted on the cart and being pivotally movable from an upright storage position to a generally horizontal luggage carrying position, the improvement comprising a swingable latch bar swively mounted only at one end on the luggage carrier and selectably movable from a storage position to a luggage carrier locking position, latch means carried on an opposite end of said bar and locking the latch bar in said storage position with said luggage carrier for easy transport of the cart so as not to interfere with the pivoted folding movement of the luggage carrier and also alternatively locking the latch bar to said luggage carrier when said bar is in the luggage carrier locking position for ready transport of luggage, said latch bar having hinge means intermediate its opposite ends, the latch bar extending in a plane generally parallel to said luggage carrier when in said storage position and extending across the luggage carrier and adjacent and abutting said upright stand when the luggage carrier is in said luggage carrying position, the swingable latch bar and the latch means comprising molded synthetic plastic components having snap-in, snap-out retaining action for latching the latch bar and the luggage carrier together in either of said storage and luggage carrier locking positions, said upright stand including two horizontally spaced vertically extending posts in ground engagement and cooperating with said wheels to maintain the cart in a self standing position.

10. The cart of claim 9 further characterized by said hinge means comprising a synthetic plastic web having a reduced thickness compared to said latch bar, said reduced thickness being of the order of 0.013" to 0.020" thick.

11. The cart of claim 9 further characterized by said hinge means comprising a synthetic plastic web having a reduced thickness compared to said latch bar, said reduced thickness being of the order of 0.013" to 0.020" thick, the synthetic plastic web being located along a bottom side of the latch bar with the bottom side being engageable on top of said luggage carrier when the latch bar and its latch means secures said luggage carrier in its luggage carrying position.

12. In a collapsible luggage cart including an axle, wheels mounted thereon, an upright stand mounted on the axle and a luggage carrier pivotably mounted on the cart and being pivotally movable from an upright storage position to a generally horizontal luggage carrying position, the improvement comprising a swingable latch bar swively mounted only at one end on the luggage carrier, and selectively movable in a plane substantially parallel to the luggage carrier from a storage position to a luggage carrier locking position, latch means carried on an opposite end of said bar and locking the latch bar in said storage position with said luggage carrier for easy transport of the cart and also alternatively for locking the luggage carrier in the luggage carrying position for ready transport of luggage, the swingable latch bar and the latch means comprising molded synthetic plastic components having a snap-in, snap-out retaining action for latching the latch bar to the luggage carrier in either of said storage and luggage carrier locking position, and hinge means located between said one end and said latch means, enabling said latch means to be moved toward and away from said luggage carrier to effect said snap-in, snap-out retaining action.

13. The cart of claim 12 further characterized by said swingable latch bar being swingable on a pivot through an angle of at least 90 degrees from its storage position to its luggage carrier locking position, the latch means being securable with a side frame of said luggage carrier when in its upright storage position for ready transport.

14. The cart of claim 12 further characterized by said luggage carrier comprising a U-shaped wire frame and having a cross piece portion at a bight area of the U-shaped wire frame, the cross piece portion having a pair of spaced U-shaped legs for supporting the luggage carrier in ground engagement at an end most distant from its pivot connection with the cart.

15. The cart of claim 12 further characterized by said swingable latch bar being swingable through an angle at least 90 degrees from its luggage carrier locking position when securing said luggage carrier in its luggage carrying position to its storage position for ready transport when the luggage carrier is pivoted in its upright storage position, the latch bar being latchable with said luggage carrier in either of said luggage carrier locking and storage positions.

16. The cart of claim 12 further characterized by said luggage carrier comprising a U-shaped wire frame having two legs and a cross piece with said swingable latch bar being pivotally connected to one leg of said U-shaped wire frame and with said latch means being affixed to another leg of said U-shaped wire frame and with said legs being positioned in parallel relation to one another.

17. The cart of claim 12 further characterized by said upright stand including two horizontally spaced upright posts in ground engagement and cooperable with said wheels in spaced relation thereto for maintaining the cart in a self standing position for loading and for sustaining the cart when in an at rest position.

18. The cart of claim 12 further characterized by hinge means comprising a synthetic plastic web having a reduced thickness compared to said latch bar, said reduced thickness being of the order of 0.013" to 0.020" thick.

19. The cart of claim 12 further characterized by hinge means comprising a synthetic plastic web having a reduced thickness compared to said latch bar, said reduced thickness being of the order of 0.013" to 0.020" thick, the synthetic plastic web being located along a bottom side of the latch bar with the bottom side of the latch bar being engagable on top of said luggage carrier when the latch bar and its latch means secures said luggage carrier in its luggage carrying position.

20. The cart of claim 12 further characterized by said luggage carrier comprising a U-shaped wire frame and having a cross piece portion at a bight area of the U-shaped wire frame, the cross piece portion having a pair of spaced U-shaped legs for supporting the luggage carrier in ground engagement at an end most distant from its pivot connection with the cart, the latch means comprising separate spaced notches on said synthetic plastic latch bar.

21. The cart of claim 20 further characterized by said separate spaced notches each having a pair of flared spaced lead-in edges to assist in locating and engaging the notches in the snap-in, snap-out retaining action.

22. In a luggage cart including a pair of spaced wheels mounted on an axle, an upright frame, bracket means mounting the upright frame on the axle, the improvement comprising a luggage platform swingably supported on the axle in operative assembly therewith, the platform being pivotally mounted on the cart and movable from a luggage carrying position to an upright storage position in close adjacency to said upright frame, a synthetic plastic latch bar movable in a plane substantially parallel to the luggage platform enabling the latch bar to be moved from a platform latching position to a storage position so as not to interfere with pivotal folding movement of the luggage platform and vice-versa, pivot means between one end of the latch bar and the luggage platform enabling the latch bar to be swung from its platform latching position to its storage position, latch means adjacent a free end of said latch bar remotely located from said pivot means for latched engagement with the platform when the latch bar is in its platform latching position for locking the swingable luggage platform in its luggage carrying position, and a flexible hinge intermediately located between opposite ends of said latch bar enabling the free end of the latch bar to be lifted on a flexible hinge out of latched engagement by disengaging said latch means from latched engagement with said platform.

23. The luggage cart of claim 22 further characterized by the upright frame being so positioned relative to the bracket means and the wheels so that the upright frame and wheels co-act to enable the cart to stand in upright otherwise unsupported position.

24. The luggage cart of claim 22 further characterized by said latch bar having a second latch means latchingly cooperable with said luggage carrying platform only when the latch bar is in its storage position.

25. The luggage cart of claim 24 further characterized by the second latch means for securing the latch bar in its storage position with the luggage platform being molded integral in one piece with said synthetic plastic latch bar.

26. The luggage cart of claim 22 further characterized by an extendable handle structure being mounted on the upright frame, handle mounting means between the handle structure and the upright frame enabling the handle structure to be mounted in an extended position and a retracted position.

27. The luggage cart of claim 22 further characterized by the latch bar having an upright feet contoured portion for reinforced nested engagement with legs of said upright frame when the latch bar is latched in its luggage platform latching position for securing the luggage platform in its horizontal luggage carrying position.

28. The luggage cart of claim 27 further characterized by the upright feet contoured portion being molded integral in one piece with said synthetic plastic latch bar.

29. The luggage cart of claim 22 further characterized by the luggage platform having wire feet at an outer free end for supporting the luggage platform in a horizontal plane when the luggage cart is in an upright self supporting position.

30. The luggage cart of claim 22 further characterized by an elastic cord being mounted on the cart for securing the luggage platform in its upright storage position.

31. The luggage cart of claim 22 further characterized by the latch means for securing the latch bar in a latched position to the luggage platform being molded integral in one piece with the synthetic plastic latch bar.

32. The luggage cart of claim 22 further characterized by said latch bar being comprised of unfilled polypropylene of an injection mold grade.

* * * * *